US005541482A

United States Patent [19]

Siao

[11] Patent Number: 5,541,482
[45] Date of Patent: Jul. 30, 1996

[54] ELECTRODELESS DISCHARGE LAMP INCLUDING IMPEDANCE MATCHING AND FILTER NETWORK

[75] Inventor: Roger Siao, Mountain View, Calif.

[73] Assignee: Diablo Research Corporation, Sunnyvale, Calif.

[21] Appl. No.: 64,779

[22] Filed: May 19, 1993

Related U.S. Application Data

[63] Continuation-in-part of Ser. No. 887,166, May 20, 1992, abandoned.

[51] Int. Cl.[6] .................................................... H02K 23/12

[52] U.S. Cl. .......................... 315/248; 315/267; 315/276; 330/188; 330/195; 330/207 R

[58] Field of Search .................................... 315/248, 267, 315/276, 278, 39; 330/188, 195, 207

[56] References Cited

U.S. PATENT DOCUMENTS

| | | |
|---|---|---|
| 3,227,923 | 1/1966 | Marrison . |
| 3,500,118 | 3/1970 | Anderson . |
| 3,521,120 | 7/1970 | Anderson . |
| 3,987,334 | 10/1976 | Anderson . |
| 3,987,335 | 10/1976 | Anderson . |
| 4,010,400 | 3/1977 | Hollister . |
| 4,017,764 | 4/1977 | Anderson . |
| 4,024,431 | 5/1977 | Young . |
| 4,048,541 | 9/1977 | Adams et al. . |
| 4,117,378 | 9/1978 | Glascock, Jr. . |
| 4,119,889 | 10/1978 | Hollister . |
| 4,166,234 | 8/1979 | Tak et al. . |
| 4,171,503 | 10/1979 | Kwon . |
| 4,178,534 | 12/1979 | McNeill et al. . |
| 4,206,387 | 6/1980 | Kramer et al. . |
| 4,240,010 | 12/1980 | Buhrer . |
| 4,245,178 | 1/1981 | Justice . |
| 4,245,179 | 1/1981 | Buhrer . |
| 4,253,047 | 2/1981 | Walker et al. . |
| 4,254,363 | 3/1981 | Walsh . |
| 4,260,931 | 4/1981 | Wesselink et al. . |
| 4,376,912 | 3/1983 | Jernakoff . |
| 4,383,203 | 5/1983 | Stanley . |
| 4,390,813 | 6/1983 | Stanley . |
| 4,422,017 | 12/1983 | Denneman et al. . |
| 4,536,675 | 8/1985 | Postma . |
| 4,568,859 | 2/1986 | Houkes et al. . |
| 4,622,495 | 11/1986 | Smeelen . |
| 4,625,152 | 11/1986 | Nakai . |
| 4,631,449 | 12/1986 | Peters, Jr. ................................ 315/205 |
| 4,645,967 | 2/1987 | Houman et al. . |
| 4,661,746 | 4/1987 | Postma et al. . |
| 4,675,577 | 6/1987 | Hanlet . |
| 4,704,562 | 11/1987 | Postma et al. . |
| 4,710,678 | 12/1987 | Houkes et al. . |
| 4,727,294 | 2/1988 | Houkes et al. . |
| 4,727,295 | 2/1988 | Postma et al. . |

(List continued on next page.)

FOREIGN PATENT DOCUMENTS 2163014A 2/1986 United Kingdom ........... H05B 41/39

OTHER PUBLICATIONS

Brochure of The operating principles of the Philips QL lamp system, "QL Induction Lighting", Philips Lighting B.V., 1991.

*Primary Examiner*—Vincent P. McGraw
*Assistant Examiner*—Reginald N. Ratliff
*Attorney, Agent, or Firm*—Skjerven, Morrill, MacPherson, Franklin & Friel; David E. Steuber

[57] ABSTRACT

An impedance matching and filter network is disclosed. The network performs two preselected impedance transformations and provides a filtering function to attenuate harmonics of an electrical signal delivered at an input of the network. The network may advantageously be structured in the form of balanced dual filters which are referenced to a virtual ground between them, the virtual ground being connected to a shield which surrounds the electric components. The network is particularly suitable for use with electrodeless discharge lamps to provide an impedance matching function for the induction coil and to limit RFI.

48 Claims, 11 Drawing Sheets

U.S. PATENT DOCUMENTS

| | | |
|---|---|---|
| 4,728,867 | 3/1988 | Postma et al. . |
| 4,792,727 | 12/1988 | Godyak . |
| 4,797,595 | 1/1989 | De Jong . |
| 4,812,702 | 3/1989 | Anderson . |
| 4,864,194 | 9/1989 | Kobayashi et al. . |
| 4,894,590 | 1/1990 | Witting . |
| 4,922,157 | 5/1990 | van Engen et al. . |
| 4,927,217 | 5/1990 | Kroes et al. . |
| 4,940,923 | 7/1990 | Kroontje et al. . |
| 4,952,844 | 8/1990 | Godyak et al. . |
| 4,962,334 | 10/1990 | Godyak . |
| 4,977,354 | 12/1990 | Bergervoet et al. . |
| 4,987,342 | 1/1991 | Godyak . |
| 5,006,752 | 4/1991 | Eggink et al. . |
| 5,006,763 | 4/1991 | Anderson . |
| 5,013,975 | 5/1991 | Ukegawa et al. . |
| 5,013,976 | 5/1991 | Butler . |
| 5,023,566 | 6/1991 | El-Hamamsy et al. . |
| 5,118,997 | 6/1992 | El-Hamamsy . |
| 5,200,672 | 4/1993 | Sheynberg . |

Transformation of $Z_1$ due to $C_3$

Transformation of $Z_2$ due to $C_3$

Transformation of $Z_1$ due to $L_3$

Transformation of $Z_2$ due to $L_3$

Transformation of $Z_1$ due to $C_2$

Transformation of $Z_2$ due to $C_2$

Transformation of $Z_2$ due to $L_2$

Transformation of $Z_1$ due to $L_2$

Transformation of $Z_2$ due to $C_1$

Transformation of $Z_1$ due to $C_1$

Transformation of $Z_2$ due to $L_1$

Transformation of $Z_1$ due to $L_1$

ELECTRODELESS DISCHARGE LAMP INCLUDING IMPEDANCE MATCHING AND FILTER NETWORK

This application is a continuation-in-part of application Ser. No. 07/887,166, filed May 20, 1992, now abandoned.

CROSS-REFERENCE TO RELATED APPLICATIONS

This application is related to, and incorporates by reference, the following U.S. patent applications, all of which were filed May 20, 1992: application Ser. No. 07/883,850, now U.S. Pat. No. 5,397,966; application Ser. No. 07/883,972, now abandoned; application Ser. No. 07/883,971 now abandoned; application Ser. No. 07/886,718, now abandoned; and application Ser. No. 07/887,168, now U.S. Pat. No. 5,306,986.

1. Field of the Invention

This invention relates to impedance matching and filter networks and in particular to an impedance matching and filter network for use with an electrodeless discharge lamp.

2. Background of the Invention

Electrodeless discharge lamps are described in sources such as U.S. Pat. No. 4,010,400 to Hollister, incorporated herein by reference, which describes an electrodeless discharge lamp including an induction coil positioned in a central cavity surrounded by a sealed vessel. The vessel contains a mixture of a metal vapor and an ionizable gas. Mercury vapor and argon are frequently used. The induction coil is connected to a capacitor network, and the L-C combination is supplied by a radio frequency signal generated by an oscillator and passed through an amplifier. When the L-C network is energized by this signal, it resonates, and the induction coil generates electromagnetic energy which is transferred to the gaseous mixture in the sealed vessel.

Electrodeless discharge lamps operate in two stages. In the "start-up", electromagnetic discharge mode, as the lamp is being turned on, the electric field from the induction coil causes some of the atoms in the gaseous mixture to be ionized. The electrons which are freed in this process circulate around the induction coil within the sealed vessel. Collisions between these electrons and the atoms release additional electrons until a plasma of circulating charged particles is formed. The induction coil and plasma behave in a manner similar to a transformer, with the coil acting as the primary winding and the discharge current acting as the secondary winding. Because of air gaps between the coil and the sealed vessel itself, which is typically made of glass, the magnetic coupling between the coil and the gaseous mixture is normally quite poor.

Many of these collisions excite the mercury atoms to a higher energy state rather than ionizing them. As the mercury atoms fall back from the higher energy state, they emit radiation, primarily nonvisible light in the UV portion of the spectrum. This radiation impinges on phosphors which coat the inside surface of the vessel. The phosphors in turn are excited by the UV radiation and emit visible light. During the steady-state stage of operation, after the plasma in the gaseous mixture has been established, the magnetic field generated by the induction coil becomes of primary importance in maintaining the discharge.

In order to ionize the gaseous mixture, a minimum voltage gradient in the plasma is required. One way to generate a high voltage across the coil and achieve this electric field is to use a series L-C resonant circuit. It is difficult to maintain the exact natural frequency of the series resonant circuit, however, because of the nonlinear impedance characteristic of the plasma load, which is reflected back into the induction coil. The impedance looking into the series L-C network (the induction coil/capacitor combination) is some R±jx, wherein both R and jx depend on the temperature and pressure of the gaseous mixture, the power input, the number of turns of the coil, and the actual physical size of the bulb.

For a given combination of these parameters, the induction coil/plasma combination must satisfy several important conditions, the most important of these being the following.

1. During the start-up stage the initial ionization is due to the E-field provided by the voltage across the induction coil. At an input power level of approximately 3–6 watts, the plasma ionization switches from an E-field mode to an H-field mode. This level is defined as the turn-on voltage. Turn-on must occur at a voltage substantially below the target steady-state voltage, because the DC input voltage is normally a rectified AC voltage which is subject to significant fluctuations. Otherwise, the operation of the lamp will be impaired if the supply voltage dips below the threshold voltage necessary to turn the lamp on.
2. The induction coil must supply a predetermined level of power to the gaseous mixture while the lamp is operating in its steady state.
3. The waveform supplied from the power sources is often a square wave or relative thereof which is rich in harmonics. To minimize radio frequency interference (RFI) with televisions and other devices, these unwanted harmonics must be substantially attenuated.

For example, in one embodiment of an electrodeless discharge lamp, an induction coil is supplied through a Class D amplifier, preferably an amplifier as described in the above-referenced application Ser. No. 07/887,168. The supply voltage to the amplifier is 130 volts, and the amplifier operates at 13.56 MHz. The output of the amplifier is a modified square wave which has numerous harmonics. To insure an adequate margin between the supply voltage and the turn-on voltage, it is desired to turn the lamp on at approximately 60–100 volts, or about half the DC voltage supplied to the amplifier. The steady-state RF power consumption of the lamp is typically designed to be about 19 watts.

The prior art fails to disclose a device for insuring that all of the above conditions are satisfied in such a lamp.

SUMMARY OF THE INVENTION

In accordance with this invention, an impedance matching and filter network is interposed between an amplifier and an induction coil in an electrodeless discharge lamp. The coil/plasma load has an inherent impedance which varies with the power input as well as other parameters such as the temperature and pressure of the discharge gas. The impedance matching and filter network is constructed such that, in combination with the coil/plasma load, it provides a desired impedance both at start-up and at a desired steady-state impedance. For example, in one embodiment, the impedance matching and filter network insures that 3 to 6 watts of RF power are supplied at 60–100 volts DC input during start-up. It also insures that about 19 watts of RF power are supplied at 130 volts during steady-state operation. The lamp operates at a frequency of 13.56 MHz, and the network filters out harmonics of that fundamental frequency before they reach the coil/plasma network. Failure to reduce these harmonics could result in unwanted electronic radiation that could interfere with televisions and other communications equipment.

In one embodiment according to this invention, the impedance matching and filter network comprises three inductors connected in series with the coil/plasma, and three capacitors connected in parallel with the coil/plasma. As described herein, the values of the inductors and capacitors are established by a defined technique which insures that all of the desired operating conditions are satisfied. If the ground is made sufficiently heavy (low impedance) and the components are sufficiently isolated from each other electrically, the RFI generated by the lamps may be maintained within FCC requirements.

The embodiment described above may nonetheless produce unacceptable RFI levels owing to the close physical proximity of the components. If, for example, the power amplifier, the impedance matching and filter network and the induction coil share a common circuit ground, harmonic currents generated by the amplifier may circulate around the small grounding surface, which contains a finite impedance. As a result, a surface voltage potential develops along the grounding area. Since one end of the induction coil is either directly or capacitively connected to this circuit ground, it will act as a transmitting antenna and radiate a wide range of harmonics to free space.

A second problem is that, even if the noisy signal is cleaned up by the impedance matching and filter network, the induction coil operates at the fundamental frequency and will radiate its energy through free space. Even if it is within a permitted government (FCC) ISM band, it is nonetheless desirable to minimize the strength of this radiation. The excessive radiated energy may, for example, saturate the front end of a television set, particularly an older TV set.

These problems are overcome in a second embodiment according to this invention, wherein the impedance matching and filter network is split into two roughly symmetrical networks which are connected to the outputs of the amplifier. With the two symmetrical impedance matching and filter networks, the output of the amplifier, if it is single-ended, is effectively converted into double-ended outputs, which are referenced to a "virtual" ground at a common node between the two networks. This virtual ground is advantageously tied to a metal casing which surrounds the electronic components of the lamp. Since the virtual ground is isolated from the "noisy" harmonic signals by the two filters, radiation of these harmonics from the lamp is greatly reduced. The networks may also be connected to the outputs of a push-pull amplifier.

In accordance with another aspect of the invention, radiation of the fundamental frequency from the induction coil is substantially reduced or eliminated. The axial length of the induction coil is made to be very small in relation to the wavelength of the fundamental frequency. As a result, at a point removed from the induction coil, it acts as a point source of radiation which produces essentially no electric field in a lateral direction. The capacitor which is connected to the induction coil to achieve resonance is split into two capacitors of equal value which are connected on either side of the coil. With this configuration, the signals applied to the ends of the induction coil are equal in magnitude but always 180° out of phase, and the induction coil acts as a dipole antenna which oscillates about a virtual ground at the midpoint of the coil. The far field of the two halves of the dipole antenna effectively cancel each other out at any given distance and therefore eliminate any electric field in a direction along a line from the induction coil to a point removed therefrom.

The same effect may be achieved by precisely balancing the pair of impedance matching and filter networks, although this solution, using accurately balanced inductors, may be quite expensive.

Using the balanced filter network of this invention yields remarkable results in terms of RFI reduction. These results are obtained without the need for any metal coatings or other electrical shields on the lamp bulb or otherwise surrounding the plasma. Rather, the signal delivered to the induction coil is essentially "clean" (free of harmonics) and the induction coil itself acts similarly to a point source, dramatically reducing the amount of radiation at the fundamental frequency.

DESCRIPTION OF THE INVENTION

Figure 1:
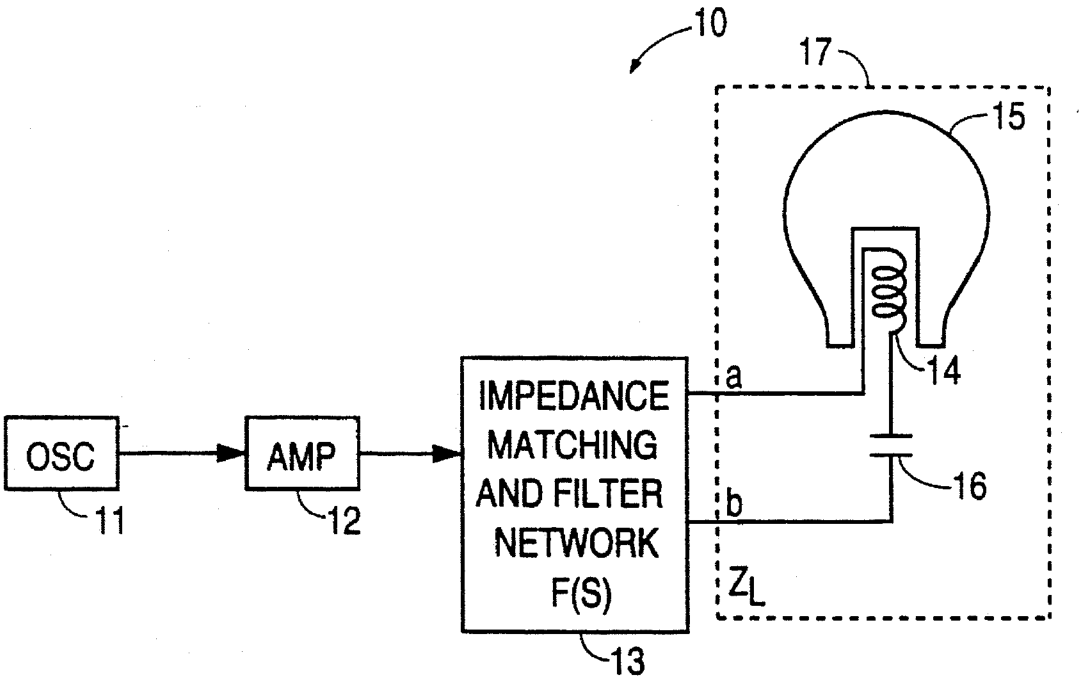
FIG. 1 illustrates a block diagram of a portion of an electrodeless discharge lamp, including an impedance matching and filter network in accordance with the invention.

As discussed above, an electrodeless discharge lamp operates in essentially two stages, referred to respectively as the start-up and steady-state stages. In the start-up stage, an electric field generated by the induction coil causes some of the atoms in the gaseous mixture to become ionized. As more and more electrons are freed in this process, a plasma of circulating charged particles is formed. The lamp should turn on (i.e., the H-field ionization process should begin) at a specified DC voltage for a given magnetic flux across the induction coil. The specified voltage should be as low as possible and is normally defined in terms of a required input power ($P_{min}$) to the series L-C induction network. Because of cost factors and physical size considerations, the regulated DC power supply feeding the amplifier normally has poor 60-cycle AC filtering, and therefore it is subject to AC fluctuations. The voltage fluctuations of the DC supply cause the RF voltage across the induction coil to be low-frequency AM modulated. During steady-state operation, the "valleys" of the AC ripples from the DC power supply should not cause the power input to fall below the required input power $P_{min}$.

It has been found that to initiate ionization, a voltage gradient of approximately 1 volt/cm must be established along the induced plasma, which generally surrounds the induction coil. In order to establish this voltage gradient, a defined input power ($P_{min}$) is required.

At steady-state operation, the lamp is designed to draw a specified amount of power (the rated power $P_R$). The efficiency of the power transfer to the plasma load is a function of the magnetic coupling factor, the chemical nature of the lamp (gas composition, temperature, pressure, etc.), and the ratio of the "loaded" Q ($Q_L$) to the "unloaded" Q ($Q_U$) of the induction coil network (including the coil, series capacitor and plasma). $Q_U$ is defined when absolutely no ionization takes place; $Q_L$ is defined when the plasma loads down the magnetic field of the induction coil. The degree of loading in the induction coil is found to be a function of the input power delivered to the plasma. For a well designed induction coil system, the ratio of loaded to unloaded Q ($Q_L/Q_U$) should be as low as possible. This will minimize the power loss in the coil. A typical ratio is approximately 10/150 (0.067). Since the ratio $Q_L/Q_U$ is low, the input impedance of the series tuned L-C induction coil network will fall between two extreme limits, i.e., $Z_1 \leqq Z_L \leqq Z_2$, where the lower limit $Z_1$ occurs before the start-up stage and the upper limit $Z_2$ occurs when a plasma has been developed in the steady-state operation of the lamp. The ratio $Z_1/Z_2$ is directly proportional to the ratio $Q_L/Q_U$.

The behavior of the reflected impedance $Z_L$ across the induction coil network in the transition from just before to just after the start-up stage is not well defined. However, $Z_L$ is known to behave in a very nonlinear fashion in this region. The behavior of $Z_L$ during the transition from just after start-up to the steady-state stage is somewhat linear. In this region, $Z_L$ is found to vary roughly in proportion to the amount of power consumed by the plasma.

Taking into account the above facts, the following general design criteria for an electrodeless discharge lamp become apparent:

1. The ratio $Q_L/Q_U$ should be kept low and preferably should be less than 0.1.
2. During steady-state operation, the "valleys" of the AC ripples from the DC power supply should not cause the power input to fall below the required input power $P_{min}$.
3. The transition from just before to just after start-up (the most nonlinear region) should occur at a low DC supply voltage level (about two-thirds the rated DC voltage), so that the nonlinear energy feedback applied to the amplifier (or driving devices) will be kept to a minimum. The stability and reliability of the amplifier is substantially enhanced if this criterion is satisfied.
4. A proper, well designed impedance matching and filtering network F(S) should be connected between the induction coil network and the amplifier to ensure that the criteria set forth in paragraphs 2 and 3 above are satisfied. The network F(S) should assure proper impedance transformations for $Z_1$ and $Z_2$ while attenuating undesirable harmonics generated by the amplifier to low levels. This filtering will reduce the radio frequency interference (RFI) radiation from the induction coil network.
5. The network F(S) should provide only purely resistive or inductive impedance transformations at the output of the amplifier. Capacitive impedance transformations would increase the $cv^2f$ losses in the amplifier. The first series element of the network F(S) should be an inductor to establish a high impedance for harmonics and to avoid a high current spike to ground during the fast transition of the signal at the output of the amplifier. Minimum circulating currents are required within the network F(S) to minimize the insertion loss of the network at the desired frequency.

As illustrated in the basic block diagram of FIG. 1, an electrodeless discharge lamp 10 includes an oscillator 11 which provides a high-frequency signal to an amplifier 12. In accordance with this invention, the output of amplifier 12 is passed through an impedance matching and filtering network F(S) 13. The output of network F(S) 13 is directed to an induction coil 14 which is situated in a central cavity of a sealed vessel 15. A capacitor 16 is connected in series with induction coil 14 such that capacitor 16 and induction coil 14 resonate at the frequency generated by oscillator 11. Induction coil 14, sealed vessel 15 and capacitor 16 are components of an induction coil network 17. The impedance looking into nodes a and b of induction coil network 17 is $Z_L$. As described above, $Z_L$ takes the form of either $Z_1$ or $Z_2$, depending on the input power, where $Z_1$ represents the impedance at start-up and $Z_2$ represents the impedance during steady-state operation. $Z_2$ should be at least 10 times larger than $Z_1$.

When energized by an oscillating signal, induction coil 14 acts as an antenna and transmits electromagnetic radiation into the surrounding environment. Amplifier 12 may be a Class D or Class E amplifier which delivers an output that may be rich in harmonics. The basic frequency of the oscillator may be set at a frequency which is within a frequency band approved by the FCC, but the harmonics may be within bands that are forbidden for electrodeless discharge lamps. For example, electrodeless discharge lamps are frequently operated at 13.56 MHz, which is approved for industrial, scientific and medical (ISM) uses. The second harmonic (27.12 MHz) and third harmonic (40.68 MHz) are also approved for ISM uses, but the fourth and fifth harmonics are fairly close to television channels 2 and 4, respectively. The prohibited frequencies above the third harmonic must in particular be filtered to avoid radio frequency interference (RFI) problems, and RF radiation at the lower frequencies should also be minimized.

Figure 2:
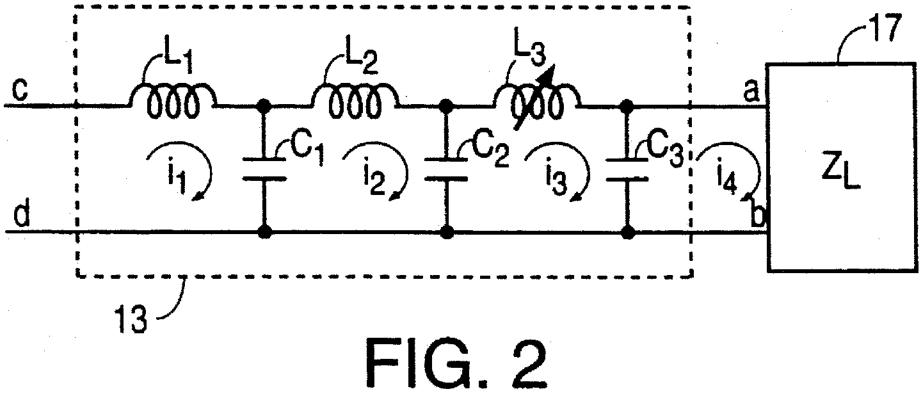
FIG. 2 illustrates a circuit diagram of an impedance matching and filter network in accordance with this invention.

FIG. 2 illustrates a circuit diagram of an embodiment of impedance matching and filter network 13 having inputs c and d. Impedance matching and filter network provides a high degree of harmonic filtering and provides proper impedance transformations of $Z_1$ and $Z_2$ into desired impedances, designated $Z_1'$ and $Z_2'$, respectively In general, for any two load impedances $Z_1$ and $Z_2$, where $Z_2$ is at least ten times larger than $Z_1$, impedance matching and filter network 13 provides an ideal way of: (i) obtaining good impedance matching, (ii) calculating mathematically the impedance transformations, (iii) obtaining a minimal part count and cost, and (iv) providing strong harmonic attenuation characteristics (40 dB or better for harmonics above the third harmonic). Impedance matching and filter network 13 includes a first series inductor $L_1$ which is followed by two other series conductors $L_2$ and $L_3$. Three parallel capacitors are also provided. A capacitor $C_1$ is connected between inductors $L_1$ and $L_2$ and ground; a capacitor $C_2$ is connected between inductors $L_2$ and $L_3$ and ground; and a capacitor $C_3$ is connected between inductor $L_3$ and network 17 and ground. Inductor $L_3$ is normally made variable to provide a final adjustment for impedance matching and filter network 13.

The following is a general description of the method of designing impedance matching and filter network 13. As noted above, $Z_2 \geqq 10Z_1$.

1. During the transformation of $Z_2$ into $Z_2'$, the Q's of network 13 must be kept low, i.e., less than two, to minimize the magnitudes of circulating currents around the L-C loops, $i_1$, $i_2$, $i_3$ and $i_4$ in FIG. 2. If these currents are too large, they will create excessive ohmic and core losses, and the efficiency of the lamp will suffer. Furthermore, low-Q transformations of network 13 reduce the sensitivity of network 13 to component variations due to tolerances as well as temperature effects.
2. The reactance of capacitor $C_3$ is made very high at the resonant frequency (of oscillator 11) so that it has only a small effect on the impedance transformation of $Z_2$ and an insignificant effect on the impedance transformation of $Z_1$. The reactance of capacitor $C_3$ is made very low, however, for frequencies (i.e., harmonics) much higher than the resonant frequency, so that high harmonic frequency attenuation can be achieved.
3. The values of inductor $L_3$ and capacitor $C_2$ are selected such that the parallel resonant frequency of inductor $L_3$ and capacitor $C_2$ is equal to the frequency provided by oscillator 11 (i.e., the operating or resonant frequency of network 13). Inductor $L_3$ has an inductance at the resonant frequency which is much larger than $Z_1$, so that $Z_1$ has very little impact on the natural frequency of the L-C combination of inductor $L_3$ and capacitor $C_2$. Inductor $L_3$ is made variable for fine adjustment to take account of inductor and capacitor tolerances. Any such adjustment has a small impact on $Z_1$. To ensure high frequency response, the self-resonant frequency of inductor $L_3$ should be significantly higher (e.g., 15 times higher) than the frequency of oscillator 11. Inductor $L_3$ is used for stepped-up impedance transformations of both $Z_1$ and $Z_2$.
4. The value of capacitor $C_2$ is selected so that capacitor $C_2$ resonates with inductor $L_3$ in the transformation of $Z_1$. Capacitor $C_2$ provides a stepped-down impedance transformation of $Z_2$.
5. Inductor $L_2$ provides a stepped-up impedance transformation of $Z_2$. Inductor $L_2$ has very little effect on the impedance transformation of $Z_1$, however, because $Z_1$ has already been substantially stepped-up. The self-resonant frequency of inductor $L_2$ is located near the 10th harmonic of the resonant frequency (of oscillator 11) to ensure strong attenuation of frequencies between the 4th and 15th harmonics.
6. Capacitor $C_1$ provides stepped-down impedance transformations of both $Z_1$ and $Z_2$. (The consequence of resonance between inductor $L_3$ and capacitor $C_2$ is that $Z_1$ becomes too high.)
7. Inductor $L_1$ provides stepped-up impedance transformations of $Z_1$ and $Z_2$. Its electrical characteristic is made similar to that of inductor $L_2$. Inductor $L_1$ and capacitor $C_1$ in combination provide additional impedance transformations for both $Z_1$ and $Z_2$. Inductor $L_1$ is carefully designed to minimize the insertion loss at the fundamental frequency. Moreover, its self-resonant frequency is set at about one harmonic order lower than that of inductor $L_2$ so that it assists inductor $L_2$ in filtering out unwanted harmonic frequencies. Thus inductor $L_1$ provides a very effective pole for the lower order harmonics. As the first series element of the network, inductor $L_1$ is important in preventing an impulse current from amplifier 12, which outputs a square wave having fast rise and fall times. This minimizes the harmonic currents and increases the efficiency of the amplifier and filter.
8. The reactances of capacitors $C_1$ and $C_2$ are made very small at frequencies above the 10th harmonic. Their low impedances at those frequencies insure that network 13 has a better or wider band frequency response. For lower harmonics, the reactances of capacitors $C_1$ and $C_2$ are small as compared to those of inductors $L_1$ and $L_2$, so that the poles of network 13 will be as effective as those of a network including small inductors and large capacitors. With this arrangement, minimal circulating currents ($i_1$ to $i_4$) will be obtained.
9. The Q's of all circuit elements (inductors $L_1$–$L_3$ and capacitors $C_1$–$C_3$) should be greater than 100 in order to obtain minimum filtering insertion loss at the resonant frequency.

The combination of inductors $L_2$ and $L_3$ and capacitor $C_2$, connected as illustrated in FIG. 2, may be connected between any networks to perform two different impedance transformations when there is a substantial change in the network impedances. Electrodeless discharge lamps are examples of devices which require two different impedance transformations.

The following example will be given to describe the construction of an impedance matching and filter network satisfying the foregoing principles will now be described. It will be understood, however, that the principles of this invention are applicable to electrodeless discharge lamps having characteristics different from those of the example. The specifications of the lamp are as follows:

Before start-up, the impedance of the induction coil network $Z_1=3.5+j2.9\ \Omega$, at 4 watts RF input into the induction coil network.

Lamp turn-on (or start-up) occurs at $60 \leqq V_{in} \leqq 100$ volts DC.

The steady-state DC supply voltage is 130 volts and 19 RF watts is delivered to the induction coil network.

At steady-state, 19 watts input, the impedance looking into the induction coil network 17: $Z_2=47-j18\ \Omega$.

The Q's of the impedance matching and filter network are $\leqq 2$.

The attenuation must be 40 dB or more for $f \geqq 3f_o$ where $f_o$ is the oscillator frequency which is equal to 13.56 MHz.

The induction coil is designed to have an inductance of 5.3 μH and an equivalent series resistance (ESR) of 2 Ω.

A complementary Class-D amplifier is used to drive the induction coil.

The following illustrates the process of designing the impedance matching and filter network. The following equation describes the relationship between the supply voltage ($V_{DD}$), the power input to the coil (P), and the transformed resistance of the coil (R).

$$P = \frac{2\,V_{DD}^2}{\pi^2 R}$$

thus

-continued $$R=\frac{2V_{DD}^2}{\pi^2 P}$$

Assuming 4 watts of RF power at start-up, and 60 V≦$V_{DD}$≦100 V, then $$182\ \Omega \leqq R \leqq 507\ \Omega$$

For steady-state operation (19 watts) the real part of $Z_2$ should be transformed to:

$$R=\frac{2V_{DD}^2}{P\pi^2}=180\Omega$$

Since the turn-on resistance of the power MOSFET transistors typically used in Class-D amplifiers is around 3 ohms, the actual input power delivered to the amplifier at steady-state will be:

$$19W\times\frac{(180+6)\Omega}{180\Omega}=19.6W$$

With $P_{in}$=19.6 W and total R=180+6=186 Ω, the DC power supply voltage must be held at 134 V DC.

1. The first step is to select a value for capacitor $C_3$. As in the case of the other circuit elements, a value is selected, based on the considerations described above, and the circuit is then tested to confirm that the desired criteria are satisfied. Initially a value of 15 pF is selected for capacitor $C_3$. At $f_o$=13.56 MHz, the impedance of $C_3$ ($X_{c3}$)=782 Ω.

Figure 3A:
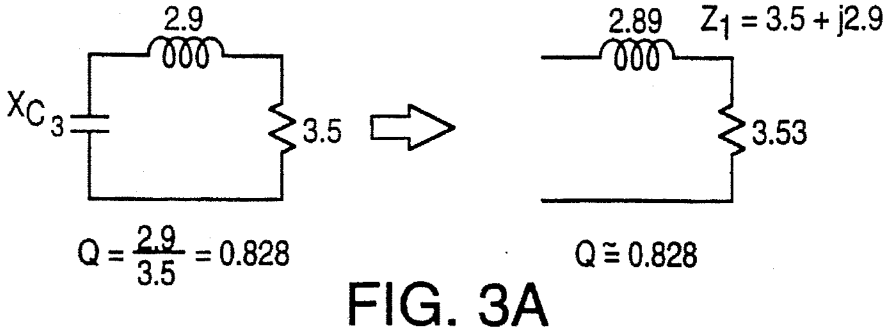
FIGS. 3A–3L illustrate impedance transformations performed by components of the impedance matching and filter network.
Figure 3B:
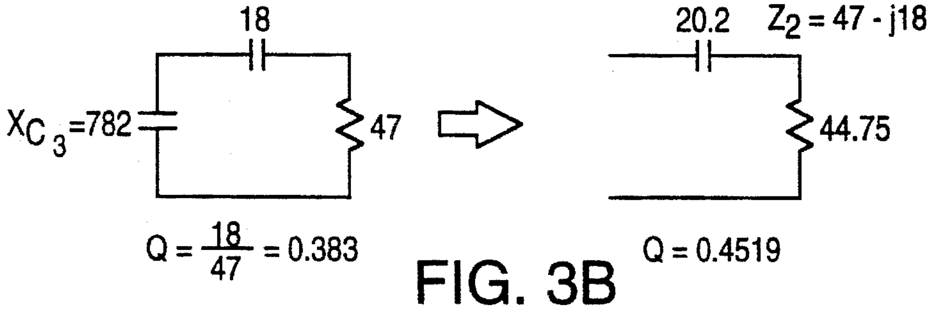

FIG. 3A illustrates the transformation of $Z_1$ as a result of $C_3$. Using Norton's and Thevenin's Laws, the parallel connection of $C_3$ is converted into its series equivalent. FIG. 3B illustrates the transformation of $Z_2$ as a result of $C_3$. As FIGS. 3A and 3B illustrate, the Q in each instance is less than 2, and capacitor $C_3$ has only a small effect on the impedance transformations of $Z_1$ and $Z_2$.

Note also that $$\left|\frac{Z_1}{Z_2}\right|=\left|\frac{47-j18}{3.5+j2.9}\right|\cong 11>10$$

Note also that the unloaded Q:

$$Q_u=2\pi\times 13.56\text{ MHz}\times\frac{5.3\ \mu\text{H}}{ESR}=\frac{451}{2}\cong 256$$

where ESR is the equivalent series resistance of the induction coil. The loaded Q is derived as follows:

$$Q_L\cong\frac{451}{47-2}\cong 10<<Q_U$$

Finally, it is clear that:

$$\frac{Q_L}{Q_U}\ \alpha\left|\frac{Z_1}{Z_2}\right|$$

Figure 3C:
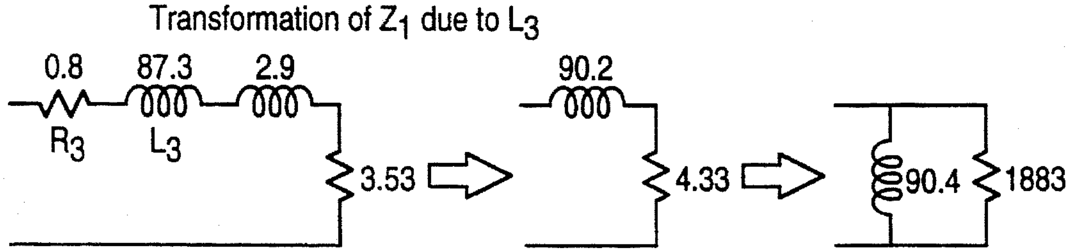
Figure 3D:
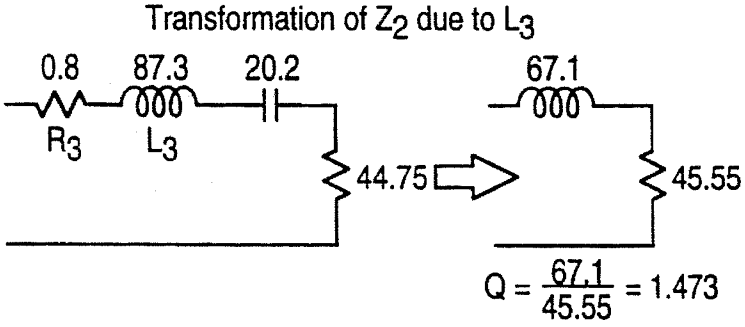

2. Next, a value of 1.025 μH is selected for inductor $L_3$, so that the reactance of $L_3$ ($X_{L3}$) is much larger than $Z_1$. Thus at 13.56 MHz, the impedance of $L_3$ is 0.8+j87.3. FIG. 3C illustrates the transformation of $Z_1$, and FIG. 3D illustrates the transformation of $Z_2$. Note that in the case of $Z_2$ the Q is $$Q=\frac{67.1}{45.55}=1.473<2$$

so that the requirement that Q be less than 2 be satisfied.

Figure 3E:
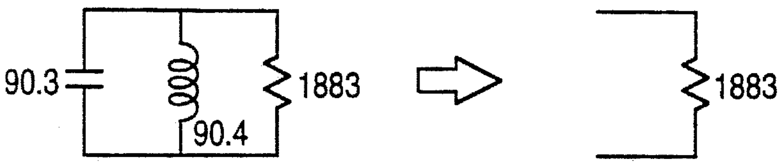
Figure 3F:
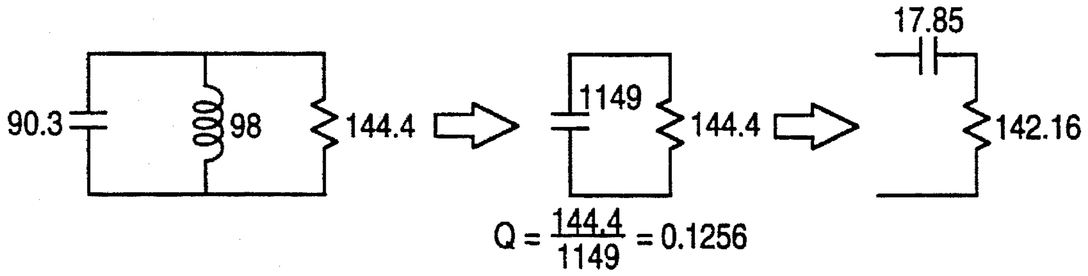

3. The value of capacitor $C_2$ is selected at 130 pF so that capacitor $C_2$ resonates with inductor $L_3$ (parallel inductance 90.4 Ω). The impedance transformations of $Z_1$ and $Z_2$ are illustrated in FIGS. 3E and 3F. Note that in the case of $Z_2$, $$Q=\frac{144.4}{114.9}=0.1256<2$$

so that again the requirement that Q be less than 2 is satisfied.

Figure 3G:
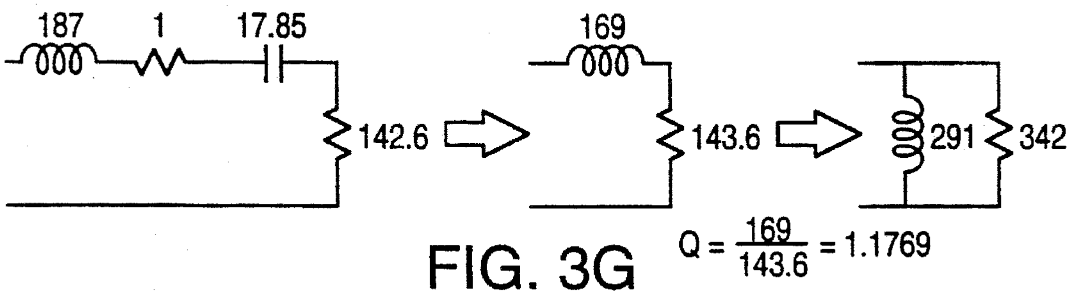

4. The purpose of inductor $L_2$ is mainly to step-up transform the real part of $Z_2$ (FIG. 3F) to a new resistance which is about twice the old value. Inductor $L_2$ is selected at 2.2 μH, which has an ESR of 1.0 Ω. The transformation of $Z_2$ is illustrated in FIG. 3G, and it is found that the following value of Q is obtained.

$$Q=\frac{169}{143.6}=1.1769<2$$

Figure 3H:
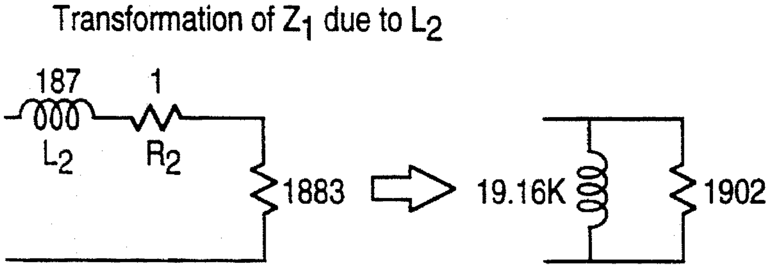

The transformation of $Z_1$ is illustrated in FIG. 3H.

Note that, with respect to $Z_2$, the resistance of 342 Ω is approximately 2.4 times the old resistance of 142.16 Ω.

Note also that inductor $L_2$ has an insignificant effect on the impedance transformation of $Z_1$.

5. The value of capacitor $C_1$ is selected so that the real part of $Z_2$ is transformed to approximately 180 Ω. To place a value on capacitor $C_1$, the following Norton-to-the tenth transformation formula is used to find the proper Q to correct impedance transformation.

$$9\text{expected }Q=\sqrt{\frac{342}{180}-1}=0.9487$$

$$\Delta X=\frac{342}{Q}=\frac{342}{0.947}=360.5\Omega$$

$$X_{C1}=\left(\frac{1}{360.5}+\frac{1}{291}\right)^{-1}=161\Omega$$

$$C_1=(161\times 2\times\pi\times 13.56\text{ MHz})^{-1}=72.9\text{ pF}$$

Figure 3I:
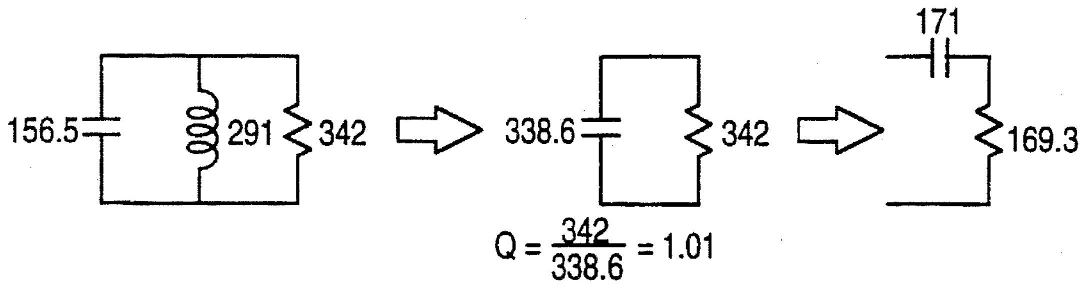
Figure 3J:
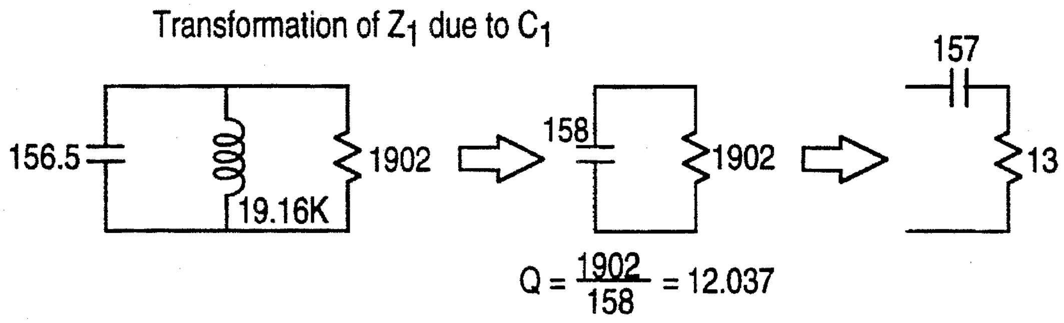

On this basis, the value of capacitor $C_1$ is selected at 75 pF, which is a standard value. At the resonant frequency of 13.56 MHz, the reactance of capacitor $C_1$ equals 156.5 Ω. FIG. 3I illustrates the impedance transformation of $Z_2$ as a result of $C_1$, and FIG. 3J illustrates the impedance transformation of $Z_1$ as a result of $C_1$. With respect to $Z_2$, note that the Q is 1.01.

6. Inductor $L_1$ is computed using the Thevenin to Norton transformation equation: $R_P=(i+Q^2)\,R_S$ where $R_P$= 108 $R_S$=169.3 solving for Q:

$$Q=\sqrt{\frac{R_P}{R_S}-1}=.2513$$

therefore $$\Delta X=Q\times 169.3$$

and

-continued $$L_1 = \frac{X_{L1}}{2\pi f_o}$$

such that its reactance will partially cancel out the 171 Ω reactance of $Z_2$ (FIG. 3J) and transform the 169.3 ohm ESR to 180 Ω.

$$\text{expected } Q = \sqrt{\frac{180}{169.3} - 1} = 0.2513$$

$$\Delta X = 0.2513 \times 169.3 = 42.54\Omega$$

$$X_{L1} = 171 + 42.54 \cong 214\Omega$$

$$L_1 = \frac{214}{2\pi f_o} = 2.506\ \mu H$$

Figure 3K:
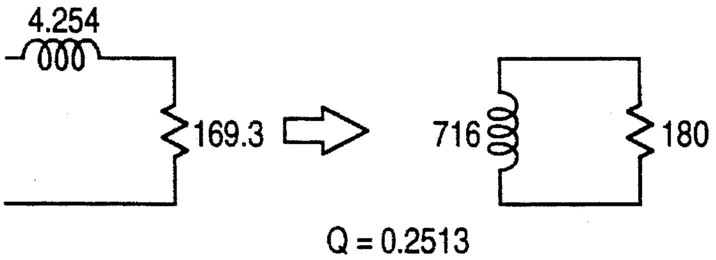
Figure 3L:
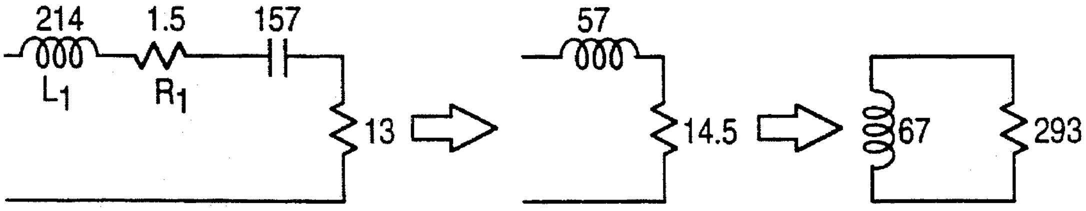

A standard value of 2.7 μH is selected for $L_1$. FIGS. 3K and 3L illustrate the impedance transformations for $Z_2$ and $Z_1$, respectively. Note that the final Q of $Z_2$ is 0.2513 which is well below the limit of 2.

To summarize the foregoing discussion, in the final impedance transformations, the original $Z_1$=3.5+j2.9 Ω is transformed to a $Z_1'$=13+j57 Ω. The original $Z_2$=47 −j18 Ω is transformed to a new $Z_2'$=169.3+j42.54 Ω. The parallel equivalent impedances are $Z'_{1P}$=293−j67 Ω and $Z'_{2P}$=180−j716 Ω. Note that the conditions 182≦R=293≦507 and R=180 Ω are met.

Accordingly, an impedance matching and filter network meeting all of the required conditions has been described. From the foregoing discussion it is apparent that impedance matching and filter network 13 meets the required conditions by performing several functions. First, it transforms the inherent impedance of the coil and capacitor in one set of conditions ($Z_1$) to a desired impedance to assure that turn-on occurs at a desired voltage level. Second, it transforms the inherent impedance of the coil and the capacitor in a different set of conditions ($Z_2$) to a desired impedance to insure that the lamp draws a desired amount of power at steady-state operation. Also, if the ground plane is made sufficiently heavy (low impedance) and the components are sufficiently isolated from each other, the network ensures that harmonics of the fundamental frequency that are strong enough to create RFI problems are substantially filtered out. In this way, the lamp can be constructed to satisfy the FCC requirements as to permissible RFI emissions.

While the impedance matching and filter network illustrated in FIGS. 1 and 2 provides adequate RFI filtering in some applications, it may not do so in others. Inputs c and d of impedance matching and filter network 13 (FIG. 2) are directly connected to the single-ended output of amplifier 12, which may be rich in harmonics. For example, a Class D or Class E power amplifier may have an efficiency of 80% or higher but may have outputs which deviate substantially from a pure sine wave and are therefore very "noisy". Designing an effective filtering network for such an amplifier to fit into a very small space, such as is available in an electrodeless lamp, with adequate isolation between components, is very difficult. This is particularly true where the amplifier, the impedance matching and filter network, and the induction coil all share a common printed circuit board and a relatively small circuit ground. In this situation, harmonic currents generated by the amplifier circulate through the circuit ground, which contains a finite impedance. As a result, a surface voltage potential develops along the grounding area. Since one end of the induction coil is either directly or capacitively connected to this circuit ground, it will act as a transmitting antenna and radiate a wide range of harmonics to free space.

Figure 4:
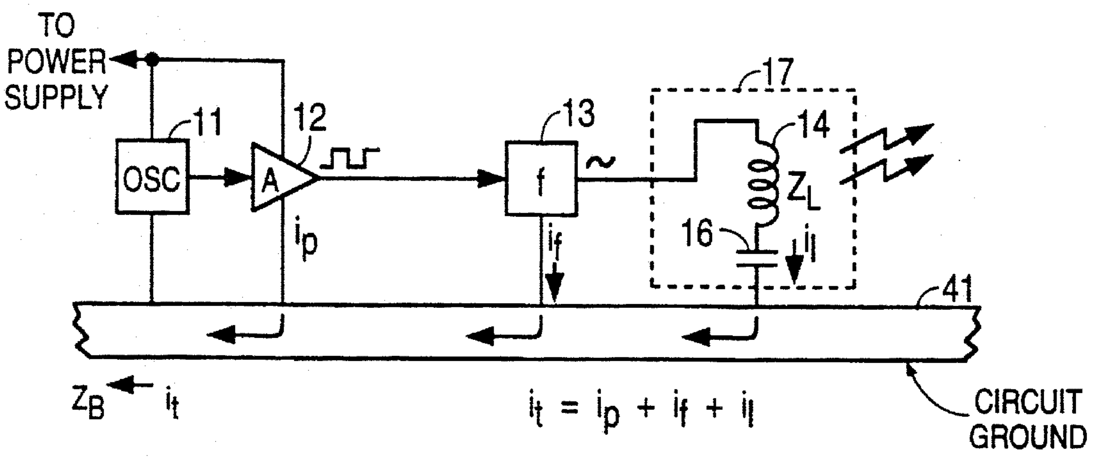
FIG. 4 illustrates schematically the results of having an amplifier and an induction coil share a common circuit ground.

This situation is illustrated schematically in FIG. 4, which shows oscillator 11, Class D amplifier 12, impedance matching and filter network 13, and induction coil network 17 all connected to a common circuit (PC board) ground 41. In FIG. 4, $i_p$ represents the pulse current flowing from amplifier 12 to circuit ground, $i_f$ represents the return-to-ground current from impedance matching and filter network 13, and $i_1$ represents the load current. According to Kirchhoff's Law, these currents are summed in circuit ground 41 and together form a total current $i_t$ equal to:

$$i_t = i_p + i_f + i_1$$

which flows through a finite impedance $Z_B$.

In a complementary voltage-switching class-D amplifier, with a DC supply voltage of 150 V, an output capacitance of 5 pF, and a switching frequency of 13.56 MHz, the power loss due to switching current $i_p$ is about 1.5 Watts. This power loss represents the sum of the losses of the individual harmonic components of the waveform generated by the amplifier during the charging and discharging of the output capacitor.

Figure 5:
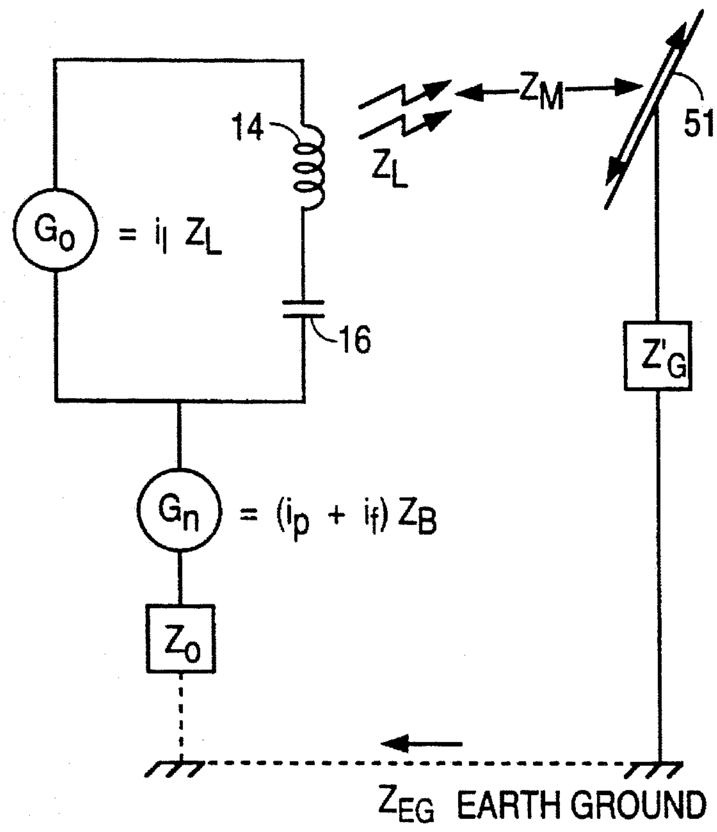
FIG. 5 illustrates an equivalent diagram, using current generators, of the elements shown in FIG. 4.

Using the fact that $i_1 Z_L \gg i_1 Z_B$, where $Z_L$ is the impedance of induction coil network 17 and $Z_B$ is the surface impedance of circuit ground 41, we can develop a simplified model as shown in FIG. 5 in terms of two equivalent current generators, $G_o$ and $G_n$. $G_o$ represents the current resulting from the fundamental frequency; $G_n$ represents the currents resulting from the harmonic frequencies. Accordingly, $G_o = i_1 Z_L$, and $G_n \approx (i_p + i_f) Z_B$. As shown, $G_o$ is in a circuit including induction coil network 17, and thus induction coil 14 radiates at the fundamental frequency. On the other hand, the current generated by $G_n$ must traverse a circuit which includes an external receiving "antenna" 51 (which could be any object which picks up radiation from induction coil 14) and a path through earth ground. $Z_M$ represents the free space impedance between induction coil 14 and antenna 51, $Z_G$ represents the impedance between lamp 10 and earth ground, $Z'_G$ represents the impedance between antenna 51 and earth ground, and $Z_{BG}$ represents the earth surface impedance between the receiving antenna and the lamp. From FIG. 5, it is apparent that to prevent induction coil 14 from radiating at the harmonic frequencies, some obstacle must be placed in this circuit path.

In other words, FIG. 5 shows that if induction coil 14 is not Faraday-shielded, it will become a radio frequency transmitting antenna, which is fed by generators $G_o$ and $G_n$. Even if the frequency of $G_o$ falls within an FCC-approved band (e.g., the band for ISM uses), the frequency of $G_n$ would contain the even and odd harmonics of the fundamental frequency. In order to meet the FCC limits, the harmonics produced by generator $G_n$ must be either eliminated or substantially reduced before they reach induction coil 14. According to this invention, a method is provided for separating, filtering and isolating generator $G_n$. This is accomplished by connecting filters to all input and output terminals of amplifier 12 and oscillator 11, and by the addition of a conductive Faraday shield around these components.

Figure 6:
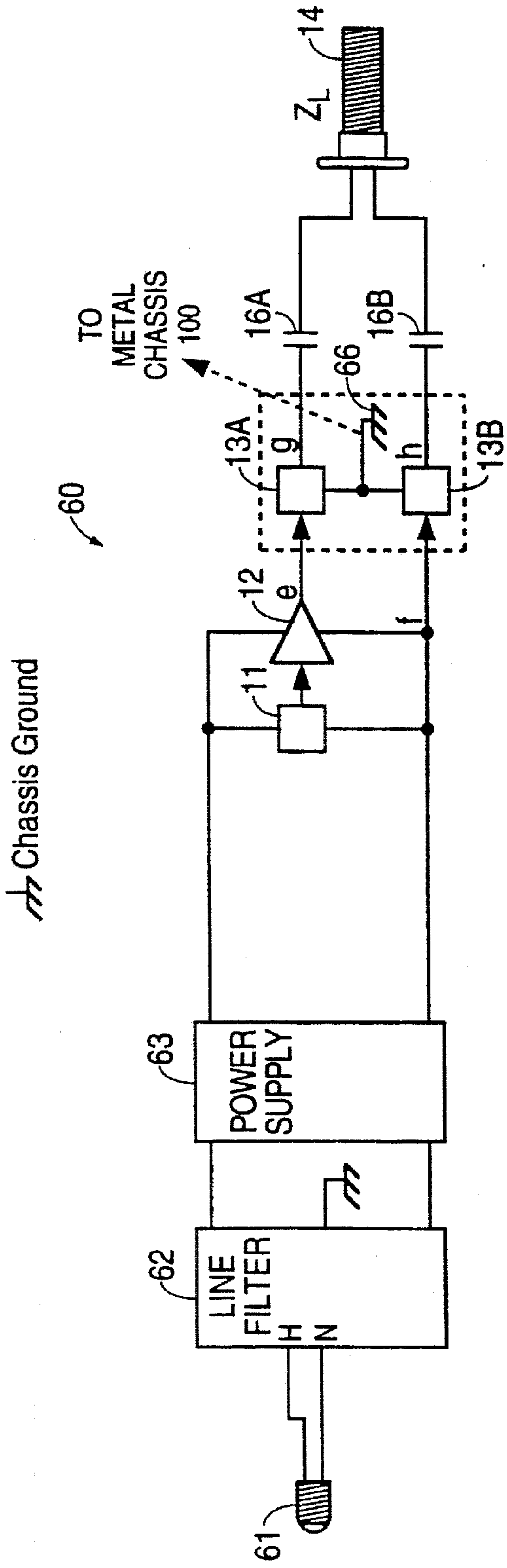
FIG. 6 illustrates a block diagram of an electrodeless discharge lamp which includes dual filters in accordance with an aspect of the invention.

FIG. 6 illustrates a block diagram of an electrodeless discharge lamp 60 in accordance with this aspect of the invention. Lamp 60 includes a conventional Edison base 61, so that it is compatible with ordinary incandescent light bulbs. Base 61 has "hot" and "neutral" contacts which are connected to terminals designated H and N in a line filter 62. The outputs of line filter 62 are connected to a power supply 63, which preferably includes a power factor controller as described in the above-mentioned application Ser. No. 07/886,718. Power supply 63 delivers a DC output which is delivered to the power inputs of oscillator 11 and amplifier 12.

In this embodiment, impedance matching and filter network 13 is in effect split into two filters, designated filter 13A and filter 13B. Filters 13A and 13B are joined and the common node is connected to a "virtual" ground 66. Virtual ground 66 is also connected to a metal chassis 100, shown in FIG. 9, which acts as a Faraday shield for the electronic components shown in FIG. 6. The respective outputs of filters 13A and 13B are connected to induction coil 14 through capacitors 16A and 16B, respectively. Filters 13A and 13B are either partially or fully magnetic coupling filters, depending on the degree of symmetry and balance. To minimize costs and save space, filters 13A and 13B may be wound on a single core, but the degree of magnetic coupling between them should be low. There is some latitude in the degree of symmetry between filters 13A and 13B. This matter is discussed further below.

The connection of symmetrical matching filters 13A and 13B to amplifier 12 converts the single-ended outputs e and f (circuit ground) of amplifier 12 into double-ended outputs which are identified in FIG. 6 as nodes g and h when referenced to virtual ground (the metal chassis 100). If the symmetrical matching filters 13A and 13B are exactly balanced (each corresponding component is a perfect match), the output signal of filters 13A and 13B will become signals equal in magnitude but opposite in phase at g and h, with respect to virtual ground. The difference between the signals at nodes g and h is equal to the magnitude of output signal of filter 13.

Figure 7:
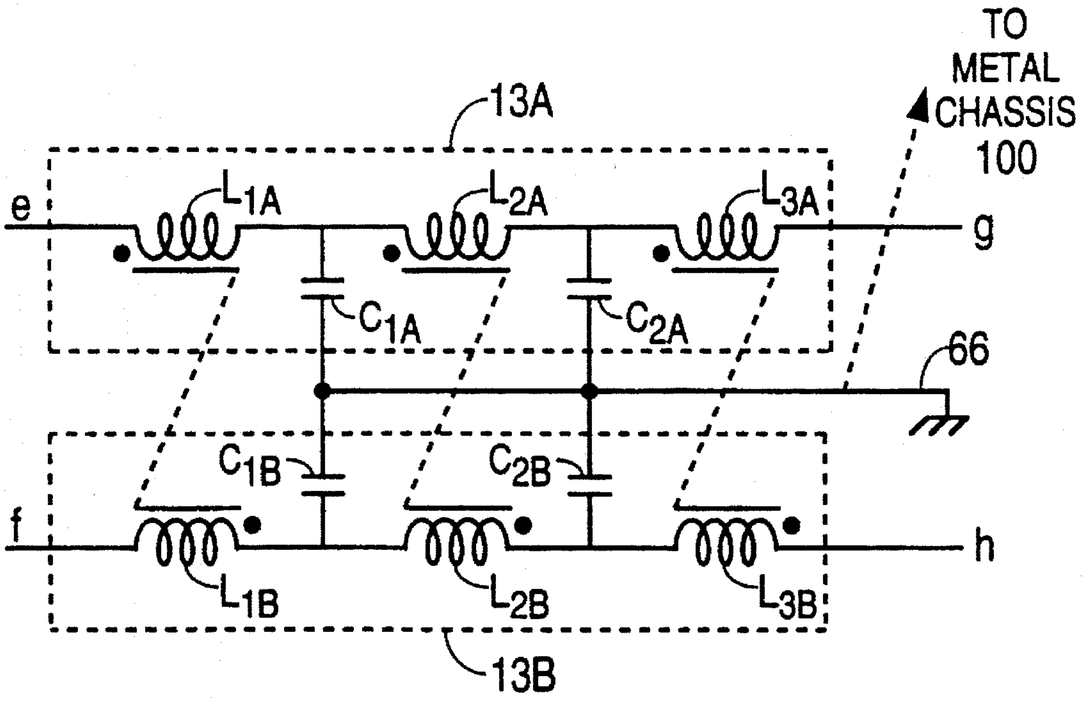
FIG. 7 illustrates a circuit diagram of dual filters.

FIG. 7 illustrates a circuit diagram of an embodiment of filters 13A and 13B. In essence, each of the components of impedance matching and filter network 13 (FIG. 2) is split into two components which are divided between filters 13A and 13B. Thus inductor $L_1$ is split into inductors $L_{1A}$ and $L_{1B}$ which are allocated to filters 13A and 13B, respectively. The same is true of inductors $L_2$ and $L_3$ and capacitors $C_1$ and $C_2$. The capacitor $C_3$ of FIG. 2 is unnecessary because there is no high-frequency noise at nodes g and h. The removal of $C_3$ will have an insignificant effect on the matching characteristics of the filters shown in FIG. 7. The common points between capacitors $C_{1A}$ and $C_{1B}$ and capacitors $C_{2A}$ and $C_{2B}$ are joined together and connected to virtual ground 66.

Each of the inductor pairs (inductors $L_{1A}$ and $L_{1B}$, $L_{2A}$ and $L_{2B}$, and $L_{3A}$ and $L_{3B}$) are of equal magnitude and preferably satisfy the following relationships:

$L_{1A}=L_{1B}$, and $L_{1A}$ in series with $L_{1B}=L_1$ $$L_{2A}=L_{2B}=\frac{L_2}{2}$$

$L_{3A}=L_{3B}$, and $L_{3A}$ in series with $L_{3B}=L_3$

Figure 8:
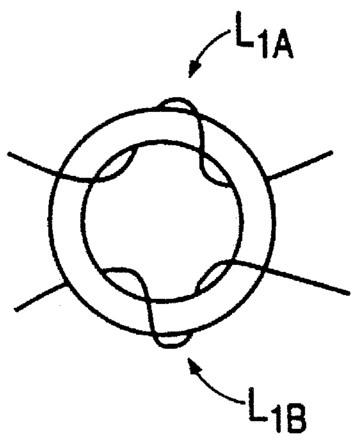
FIG. 8 illustrates a pair of oppositely wound inductors on a toroidal core.

The paired inductors are preferably formed on a single reverse-wound toroidal coil as illustrated in FIG. 8. The magnetic coupling between the individual inductors should be kept as low as possible (0.4 or lower) to ensure better filter performance characteristics.

The capacitor pairs (capacitors $C_{1A}$ and $C_{1B}$ and capacitors $C_{2A}$ and $C_{2B}$) should preferably be valued as follows:

$C_{1A}=C_{1B}=2C_1$ $C_{2A}=C_{2B}=2C_2$

Viewing FIGS. 6 and 7, it is apparent that nodes g and h, and thus induction coil 14, are isolated by filters 13A and 13B from the noise which appears at nodes e and f. Virtual ground 66, to which nodes g and h are referenced, is likewise isolated from nodes e and f. Thus, unlike the embodiments illustrated in FIGS. 2 and 4, there is no direct connection between induction coil 14 and a "noisy" circuit ground.

Figure 9:
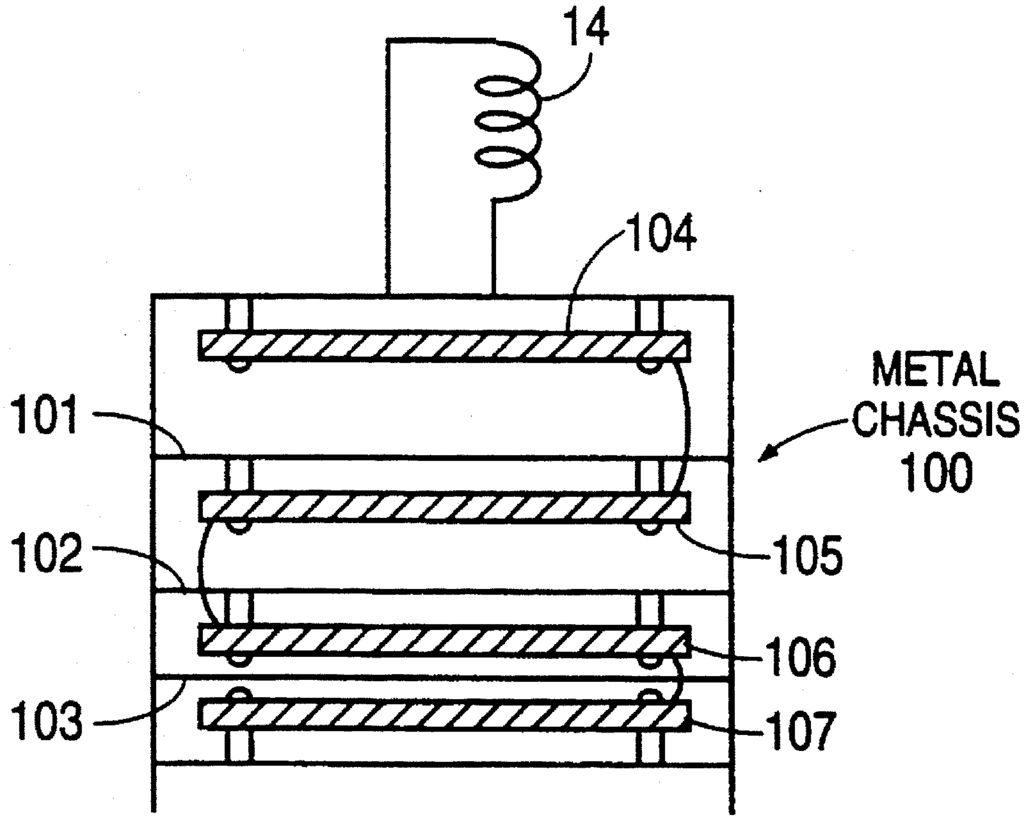
FIG. 9 illustrates a cross-sectional view of the electronic components of an electrodeless discharge lamp positioned inside a metal chassis shield.

FIG. 9 illustrates how amplifier 12, filters 13A and 3B and the remaining components of lamp 10 are mounted inside a metal chassis. Metal chassis 100 is broken into compartments by internal partitions 101, 102 and 103, which are also made of metal. Filters 13A and 13B and capacitors 16A and 16B are included in a printed circuit board (PCB) 104; oscillator 11 and amplifier 12 are included in a PCB 105; power supply 63 is included in a PCB 106; and line filter 62 is included in a PCB 107. The PCBs are mounted to the walls and partitions of metal chassis 100. PCBs 104 and 107 are connected to virtual ground 66 (metal chassis 100). PCBs 105 and 106, which contain oscillator 11, amplifier 12 and power supply 63, float. PCB 104 is connected to induction coil 14, which is positioned outside metal chassis 100.

The embodiment described above provides excellent shielding of the harmonic frequencies produced by amplifier 12, and allows the components to be positioned adjacent each other in a closely confined space such as within an electrodeless discharge lamp. Unless further precautions are taken however, the fundamental frequency will still be radiated by induction coil 14. An arrangement for minimizing radiation of the fundamental frequency will now be described.

Figure 10A:
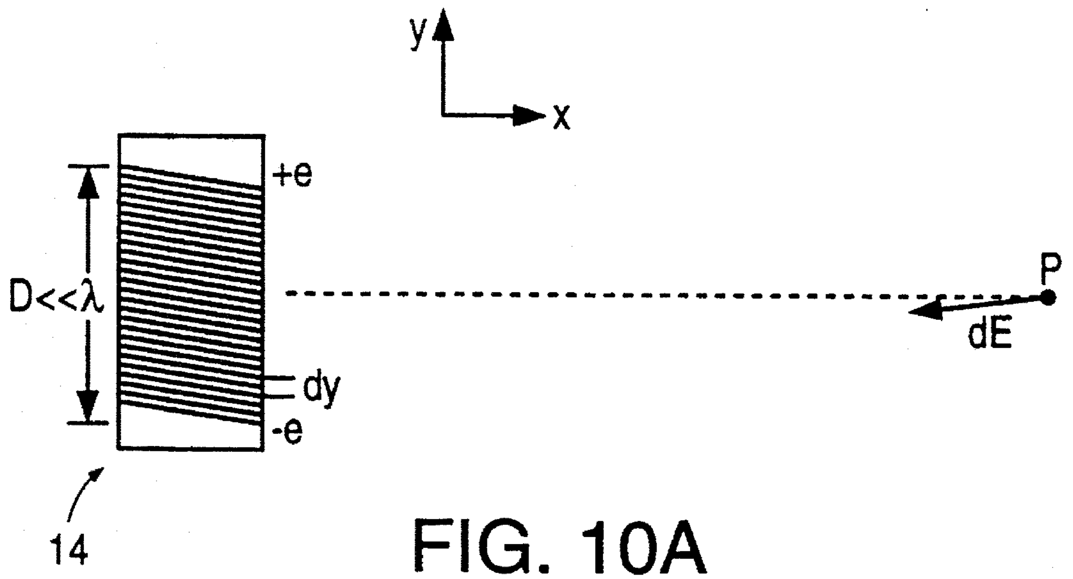
FIGS. 10*a* and 10*b* illustrate the factors which determine the strength of the electric field at a point removed from the induction coil.

FIG. 10A illustrates a view of induction coil 14, indicating that its physical length D is much less than the wavelength λ of the fundamental frequency. For example, in one embodiment D may be approximately 1 inch (2.54 cm), and at a frequency of 13.56 MHz λ=22.1 meters. Induction coil 14 is balanced about an x-axis running through its midpoint, i.e., the charge at a given distance above the x-axis is always equal and opposite to the charge at the same distance below the x-axis.

Point P in FIG. 10A represents a point well removed from coil 14 in relation to its length D. λ is the wavelength of the signal emitted by coil 14, and X is the distance between point P and coil 14. With λ>>D, and X>> D, point P sees coil 14 essentially as a point source.

The electric field experienced by point P for a given electric charge particle at distance y with reference to the center of the coil along the y axis is expressed as follows:

$$dE=\frac{1}{4\pi\epsilon_o}\ \frac{\lambda dy}{x^2+y^2}$$

Where $\epsilon_0$ is $8.85418\times10^{-12}$ $C^2/N.M^2$, the permittivity constant of Coulomb's law and X is the distance of point P from coil 14 on the x-axis. If coil 14 is balanced, the following relationship holds:

$$\int_{-D/2}^{o} dE_x\,dy=-\int_{o}^{D/2} dE_x\,dy$$

Figure 10B:
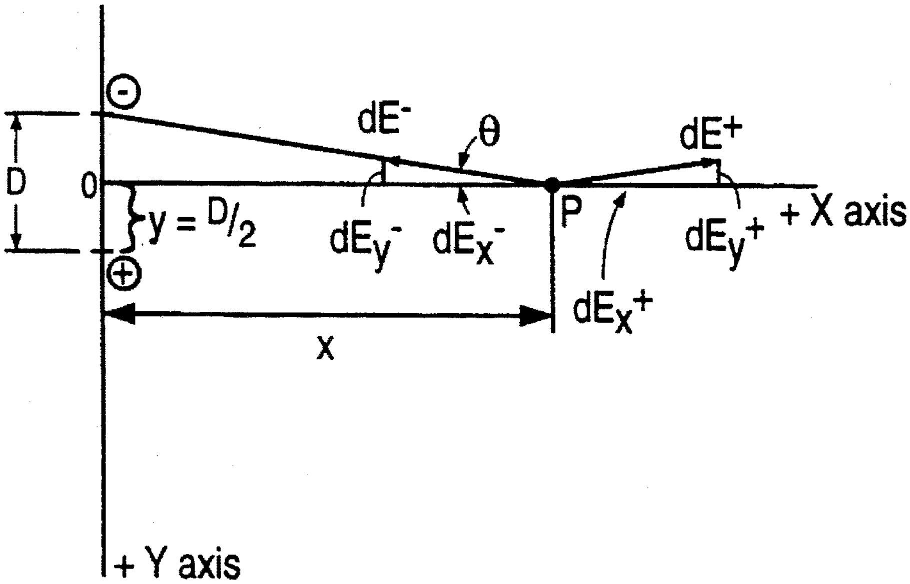

As illustrated in FIG. 10B, since X>>D and X>>D, as the angle θ approaches 0 sin θ also approaches 0. Therefore, $dE_y-=dE_y+=0$ and $$dE_{x-}=-dE_{x+}$$

where $dE_x$ is the x component of dE.

Thus, if these conditions are fulfilled (i.e., coil 14 is balanced about its center), point P experiences no net electrical field in either the x or y directions.

Figure 11:
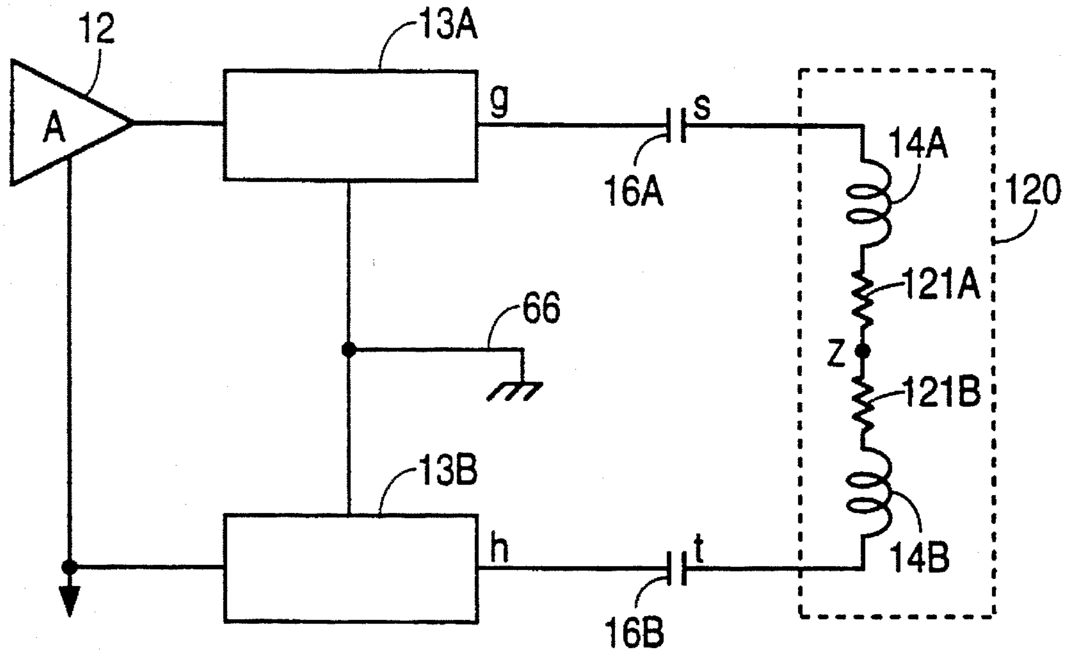
FIG. 11 illustrates a balanced pair of filters in an impedance matching and filter network in accordance with another aspect of this invention.

FIG. 11 illustrates the portion of lamp 60 (FIG. 6) which includes amplifier 12, filters 13A and 13B and capacitors 16A and 16B. For purposes of explanation, induction coil 14 is shown as split into equal halves 14A and 14B inside an induction coil unit 120. Resistors 121A and 121B together represent the reflected resistance from the induced plasma in the sealed vessel (not shown). The point labelled z represents the physical center of coil 14. The impedances of capacitors 16A and 16B are equal in magnitude but opposite in phase to the impedances of inductors 14A and 14B, such that the following relationship holds:

$$X_{16A}=X_{16B}=X_{14A}=X_{14B}$$

This satisfies the condition for resonance of capacitors 16A and 16B and inductors 14A and 14B at the operating frequency of amplifier 12.

If the components of filters 13A and 13B were perfectly matched, capacitors 16A and 16B could be omitted and the signals at points g and h would be of identical magnitude and opposite phase and the terminal voltages of the coil 14, s and t, would be balanced with respect to ground and point z (the center of coil 14). In reality, however, it can be quite expensive to obtain perfectly matched components, particularly inductors. Matched capacitors are considerably less expensive to obtain. Therefore, it is useful to consider the nature of the signals at points s and t, assuming that capacitors 16A and 16B are well matched.

Figure 12:
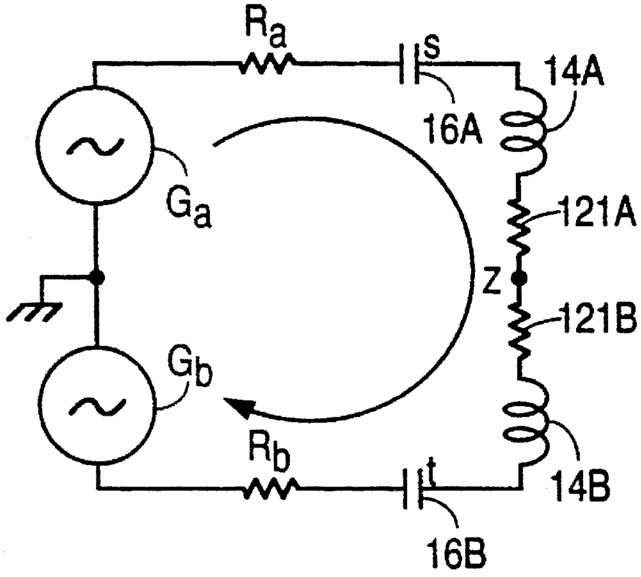
FIGS. 12, 13 and 14 illustrate equivalent circuits useful in determining the voltages at the inputs to the induction coil in the embodiment of FIG. 11.
Figure 13:
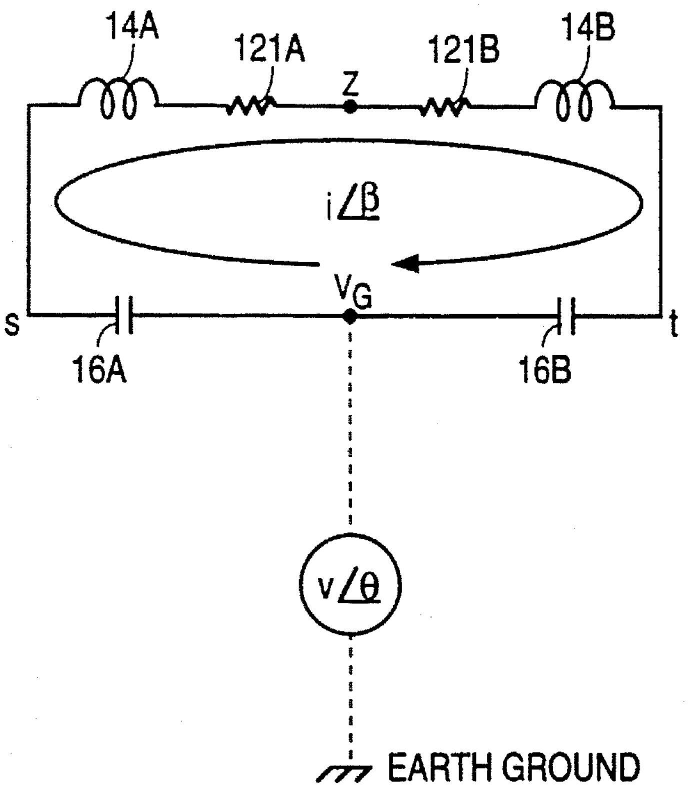

FIG. 12 illustrates an equivalent circuit in which the voltage outputs at points g and h have been replaced by equivalent signal sources $G_a$ and $G_b$ which have impedances $R_a$ and $R_b$, respectively. With proper impedance transformations, the impedance of resistors $R_a$ and $R_b$ can be made much smaller than the impedances of capacitors 16A and 16B, inductors 14A and 14B, and resistors 121A and 121B. Therefore, the variation in the impedance of resistors $R_a$ and $R_b$ as a result of temperature changes and differences in the component values of filters 13A and 13B becomes insignificant to the balanced circuit network of FIG. 12 and can be ignored. Accordingly, the equivalent circuit of FIG. 12 can be redrawn as the equivalent circuit shown in FIG. 13. Since signal sources $G_a$ and $G_b$ in FIG. 13 put out a common current around the loop, they are omitted, and an equivalent closed loop with a circulating current $i\angle\beta$ is shown. The midpoint between capacitors 16A and 16B is shown as having a voltage $v\angle\theta$ with respect to earth ground. (As will become apparent, the value of $v\angle\theta$ is used only for referencing the closed loop to earth ground and does not need to be known.)

The voltages at points s and t, referenced to $v\angle\theta$, will now be calculated. The voltage at point s can be derived as follows (C and 16B):

$$v_s=v\angle\theta-i\angle\beta(-j/\omega C/2)$$

$$v_s=v\angle\theta-i/\omega C/2(\angle\beta-90°)$$

let $$\sigma=\beta-90°$$

$$v_s=v\angle\theta-iX_{16}\angle\sigma$$

where $$X_{16}=\left|-j\frac{1}{WC/2}\right|$$

$$v_s=v\angle\theta-iX_{16}\cos\sigma-iX_{16}\sin\sigma$$

Applying the trigonometric identities:

$$-\cos\sigma=\cos(180°\pm\sigma)$$

$$-\sin\sigma=\sin(-\sigma)$$

Therefore:

$$v_s=v\angle\theta+iX_{16}(\cos 180°\pm\sigma)+iX_{16}[\sin(-\sigma)]$$

By a similar process, the voltage at point t can be shown to equal:

$$v_t=v\angle\theta+iX_{16}(\cos\sigma)+iX_{16}(\cos\sigma)$$

Therefore $$v_s+v_t=0 \text{ (referenced to } v\angle\theta)$$

or $$v_s=-v_t$$

Thus the voltage at point s is of equal magnitude but opposite phase to the voltage at point t. This being the case, point z at the midpoint between coils 14A and 14B acts as a virtual ground, and the combination of coils 14A and 14B acts as a dipole antenna. If, as described above, the electrical length of coils 14A and 14B is small in relation to the wavelength of the RFI emitted by the "antenna", a point removed from coils 14A and 14B will not experience any net electrical field as a result of the radio frequency signal which is applied to coils 14A and 14B.

Figure 14:
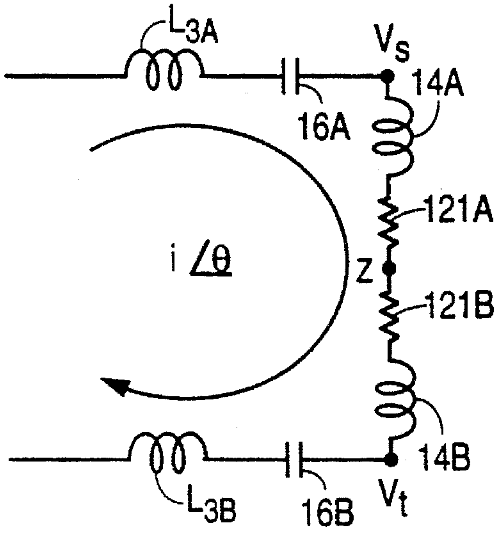

FIG. 14 illustrates the circuitry shown in FIGS. 7 and 11, including in particular inductors $L_{3A}$ and $L_{3B}$, capacitors 16A and 16B, inductors 14A and 14B, and resistors 121A and 121B. An alternative way of demonstrating that the voltages at points s and t are of equal magnitude but opposite phase is to consider the phase change imposed by each circuit component assuming a current $i\angle\theta$ flows through these components. Using the voltage at the left hand side of inductor $L_{3B}$ as the reference voltage, $v_t$ and $v_s$ can be calculated as follows $$v_s=[X_{L3B}\angle+90°+X_{16B}\angle-90°]i\angle\theta$$

$$v_s=[X_{L3B}\angle+90°+X_{121A}\angle0°+X_{14A}\angle+90°]i\angle\theta$$

since $$|X_{16A}\angle{-90°}| = |X_{16B}\angle{-90°}| = |X_{14A}\angle{+90°}| = |X_{14B}\angle{+90°}|:$$

$$V_S = [X_{L3B}\angle{+90°} + X_{121B}\angle{0°} + X_{121A}\angle{0°} + X_{14A}\angle{+90°}]\ i\angle\theta$$

This shows that $v_s$ leads $v_t$ by 180°, provided that the Q of the circuit is >10, and that the phase difference is independent of the values of $X_{L3A}$ and $L_{L3B}$.

The foregoing embodiment has been tested and has been found to emit markedly reduced RFI when operated at a frequency of 13.56 MHz. The results of these tests are shown in the following table, which shows the radiation level of the lamp at the fundamental frequency and a number of harmonics, as compared with the FCC Part 15 and Part 18 3-meter limits (47 CFR Chapters 15 and 18). All radiation levels are given in dBm.

| Frequency (MHz) | Measured Radiation | Part 15 Limit | Part 18 Limit |
|---|---|---|---|
| 13.56 | −26 | −7 | N/A |
| 27.12 | −37 | −27 | N/A |
| 41.68 | −73 | −47 | N/A |
| 54.24 | −76 | −67 | −67 |
| 67.80 | −88 | −67 | −67 |
| 81.36 | −87 | −67 | −67 |
| 108.48 | −80 to <−90 | −63 | −63 |
| to | | | |
| 203.40 | −80 to <−90 | −61 | −61 |
| 216.98 | <−90 | −61 | −61 |
| to | | | |
| 447.48 | <−90 | −61 | −61 |

Thus if the lamp is built to exact specifications, with good mechanical joints and healthy electronics, the RFI emitted by the lamp falls well below FCC limits.

This structure represents a significant advance over prior art electrodeless discharge lamps, which have traditionally used a wire mesh or other shielding structure around the radiating coil (e. g., attached to the surface of the sealed vessel) in order to reduce RFI to FCC-approved levels. The lamp of this invention achieves this necessary result without applying a metal coating, wire mesh or other shielding structure to the sealed vessel or otherwise surrounding the coil.

While a particular form of symmetrical filter is illustrated in FIG. 7, it will be understood by those skilled in the art that a wide variety of symmetrical filters can be designed, some containing, for example, Baluns transformers, conventional transformers, and frequency traps. The broad principles of this aspect of the invention are intended to cover all such variations. Moreover, while the amplifier illustrated in FIGS. 4 and 6 is a single-ended Class D amplifier, other types of single-ended or double-ended (push-pull) amplifiers may be used to provide the input signal to the filter network of this invention.

Owing to the nature of high efficiency electrodeless ballasts and the use of switching power supplies in conjunction with them, suppression apparatus is also required at the front end of lamp 60 to prevent noise and harmonics from passing on to the power lines. This can cause severe problems in communications and generate heat in the power lines. By the same token, transient energy in the power lines must be attenuated before it reaches the electronic components of power supply 63 and lamp 60.

Referring again to FIG. 6, oscillator 11 and amplifier 12 are supplied by a power supply 63, which preferably includes a power factor controller as described in the above mentioned application Ser. No. 07/886,718. In order to prevent noise generated by power supply 63 from reaching the 60 Hz supply lines, a line filter 62 is included. Line filter 62, which is of a structure known to those skilled in the art, also protects the electronic components in lamp 60 against surges and other transients in the 60 Hz AC supply voltage.

It will be apparent that the principles of this invention are applicable to electrodeless fluorescent lamps and electrodeless discharge lamps operating at various frequencies and having induction coil/plasma combinations which exhibit various electrical characteristics. Accordingly, it should be understood that the embodiment described above is illustrative only and not limiting. Many numerous alternative embodiments will be apparent to those skilled in the art all of which are included within the broad scope of this invention, as defined in the following claims.

I claim:

1. An electrodeless discharge lamp comprising:

a radio frequency generator;

an amplifier connected to an output of said radio frequency generator;

a coil network comprising an induction coil; and an impedance matching network connected between said amplifier and said coil network, said impedance matching and filter network for providing two preselected impedance transformations for said coil network at different operating conditions of said lamp.

2. The electrodeless discharge lamp of claim 1 wherein one of said operating conditions occurs approximately when said lamp turns on and the other of said operating conditions is the steady-state operation of said lamp.

3. The electrodeless discharge lamp of claim 1 wherein said impedance matching network comprises a means of filtering harmonics of the radio frequency signals generated by said generator to inhibit the passage of said harmonics to said induction coil.

4. An electrodeless discharge lamp comprising:

an oscillator;

an amplifier connected to an output of said oscillator; and an induction coil network, said induction coil network comprising an induction coil and a vessel containing a selected gas, said induction coil being operative to create a plasma of charged particles in said gas after said lamp has been turned on;

wherein said induction coil network has a first inherent impedance measured at a pair of input terminals of said network when said lamp is initially turned on and a second inherent impedance at said input terminals when said lamp is in a steady-state on condition; and said lamp comprising in addition an impedance matching network connected to said induction coil network, said impedance matching network having a pair of input terminals, said impedance matching network operative to transform said first inherent impedance to a first desired impedance measured at its input terminals when said lamp is initially turned on, and to transform said second inherent impedance to a second desired impedance measured at its input terminals when said lamp is in a steady-state on condition.

5. The electrodeless discharge lamp of claim 4 wherein said second inherent impedance is at least ten times said first inherent impedance.

6. The electrodeless discharge lamp of claim 4 wherein said impedance matching network comprises a means of filtering harmonics of a radio frequency signal generated by said amplifier to inhibit the passage of said harmonics to said induction coil.

7. An electrodeless discharge lamp comprising:

a radio frequency amplifier having two output terminals;

an induction coil network having two input terminals; and a first filter and a second filter, said first filter being connected between a first output terminal of said amplifier and a first input of said induction coil network, said second filter being connected between a second output terminal of said amplifier and a second input of said induction coil network, said first and second filters being joined together at a common node.

8. The electrodeless discharge lamp of claim 7 comprising a conductive shield for said amplifier, said common node being coupled to said conductive shield.

9. The electrodeless discharge lamp of claim 8 wherein said first and second filters and said amplifier are enclosed by said shield and said induction coil network comprises an induction coil, said induction coil being positioned outside said shield.

10. The electrodeless discharge lamp of claim 7 wherein said first and second filters are approximately symmetrical with respect to said common node.

11. The electrodeless discharge lamp of claim 7 wherein said induction coil network comprises a first capacitor connected between said first filter and an induction coil and a second capacitor connected between said second filter and said induction coil.

12. The electrodeless discharge lamp of claim 11 wherein said first and second capacitors are substantially similar.

13. The electrodeless discharge lamp of claim 7 wherein said first filter comprises a first inductance and a second inductance and said second filter comprises a third inductance and a fourth inductance, said first and third inductances being wrapped on a first common torroidal core.

14. The electrodeless discharge lamp of claim 13 wherein the magnetic coupling between the first and third inductances is less than 0.4.

15. The electrodeless discharge lamp of claim 13 wherein said first filter comprises first and second capacitors and said second filter comprises third and fourth capacitors, each of said capacitors being joined to said common node.

16. The electrodeless discharge lamp of claim 8 wherein during operation of said lamp said shield and a centerpoint of said coil are maintained at a chassis ground.

17. The electrodeless discharge lamp of claim 16 containing a pair of matched capacitors, one of said capacitors being connected to one input of said coil and the other of said capacitors being connected to the other input of said coil.

18. The electrodeless discharge lamp of claim 8 wherein said first and second filters are substantially symmetrical.

19. An electrodeless discharge lamp comprising:

a power supply;

a radio frequency oscillator;

an amplifier;

an induction coil for transmitting a radio frequency signal delivered by said amplifier so as to create a plasma of charged particles in a gas;

a first filter connected between said amplifier and said induction coil so as to inhibit the passage of radio frequency interference (RFI) to said induction coil; and a second filter connected between said power supply and a power main contact of said lamp so as to inhibit the passage of a noise signal to said power main contact.

20. An electrodeless discharge lamp comprising:

a metal chassis, said metal chassis enclosing a source of a radio frequency signal and an amplifier for amplifying said signal; and an induction coil positioned outside of said metal chassis, said metal chassis and the center of said coil being maintained at a virtual ground.

21. The electrodeless discharge lamp of claim 1 wherein said impedance matching network is for providing two preselected impedance transformations at impedances which differ by a factor of at least ten.

22. A discharge lamp containing a power supply, an oscillator and an amplifier, said amplifier being for generating an electrical signal having a frequency of at least 20 KHz, said discharge lamp further containing a line filter connected between said power supply and a power main contact of said lamp so as to inhibit the passage of a noise signal to said power main contact.

23. The discharge lamp of claim 22 wherein said discharge lamp is an electrodeless discharge lamp.

24. An electrodeless discharge lamp comprising:

a radio frequency generator;

an amplifier connected to an output of said radio frequency generator;

an induction coil having only two terminals; and a filter network connected between said amplifier and said induction coil, said filter network being configured such that the voltages at the two terminals of the induction coil are of equal magnitude and opposite phase when said lamp is operative.

25. The electrodeless discharge lamp of claim 13 wherein said second and fourth inductances are wrapped on a second common torroidal core.

26. The electrodeless discharge lamp of claim 20 wherein said chassis further encloses a power supply.

27. The electrodeless discharge lamp of claim 20 wherein said metal chassis includes a plurality of compartments, each of said compartments being enclosed by metal shielding, a first compartment containing said source of a radio frequency signal and said amplifier.

28. The electrodeless discharge lamp of claim 27 wherein a second compartment contains a pair of filters, a node between said filters being connected to said metal chassis.

29. The electrodeless discharge lamp of claim 28 wherein a third compartment contains a line filter.

30. The electrodeless discharge lamp of claim 29 wherein a fourth compartment contains a power supply.

31. An electrodeless discharge lamp comprising an oscillator, an amplifier connected to an output of said oscillator, an induction coil network comprising an induction coil and a vessel containing a selected gas, and a pair of balanced filters connected between said amplifier and said induction coil network, wherein said amplifier and said oscillator are enclosed within and insulated from a metal chassis and wherein a common node between said pair of balanced filters is connected to said metal chassis.

32. The electrodeless discharge lamp of claim 31 further comprising a line filter enclosed in said metal chassis.

33. The electrodeless discharge lamp of claim 31 further comprising a power supply enclosed in said metal chassis.

34. The electrodeless discharge lamp of claim 31 wherein said filter is enclosed in said metal chassis.

35. The electrodeless discharge lamp of claim 2 wherein the Q of said impedance matching network is less than approximately two during the steady-state operation of said lamp.

36. The electrodeless discharge lamp of claim 2 wherein said impedance matching network comprises a first and second capacitors having respective first terminals connected to a first output terminal of said network, a second terminal of said first capacitor being connected to a second output terminal of said network, a first inductor connected between said second terminal of said first capacitor and a second terminal of said second capacitor, and a second inductor having a first terminal connected to said second terminal of said second capacitor.

37. The electrodeless discharge lamp of claim 36 wherein the reactance of said first capacitor is high at an output frequency of said radio frequency generator but low at frequencies of harmonics of said output frequency.

38. The electrodeless discharge lamp of claim 36 wherein said first inductor has a self-resonant frequency which is significantly higher than an output frequency of said radio frequency generator.

39. The electrodeless discharge lamp of claim 36 wherein a parallel resonant frequency of said first inductor and said second capacitor is equal to an output frequency of said radio frequency generator.

40. The electrodeless discharge lamp of claim 36 wherein said second capacitor resonates with said first inductor when said lamp turns on.

41. The electrodeless discharge lamp of claim 36 wherein said second inductor has a self-resonant frequency located near the frequency of the 10th harmonic of an output frequency of said radio frequency generator.

42. The electrodeless discharge lamp of claim 36 wherein said impedance matching network further comprises a third capacitance having a first terminal connected to said first output terminal of said network and a second terminal connected to a second terminal of said second inductor, and a third inductor connected to said second terminal of said third capacitor.

43. The electrodeless discharge lamp of claim 42 wherein the electrical characteristics of said second and third inductors are similar.

44. The electrodeless discharge lamp of claim 42 wherein the self-resonant frequency of said third inductor is set about one harmonic order lower than the self-harmonic frequency of said second inductor.

45. The electrodeless discharge lamp of claim 42 wherein the respective reactances of said second and third capacitors are very small at frequencies above the frequency of the 10th harmonic of an output frequency of said radio frequency generator.

46. The electrodeless discharge lamp of claim 44 wherein the respective reactances of said second and third capacitances are small compared to the respective reactances of said second and third inductors at frequencies of the harmonics below the 10th harmonic of an output frequency of said radio frequency generator.

47. The electrodeless discharge lamp of claim 42 wherein the respective Q's of said first, second and third inductors and said first, second and third capacitors are greater than 100.

48. The electrodeless discharge lamp of claim 36 wherein the respective Q's of said first and second inductors and said first and second capacitors are greater than 100.

* * * * *